(12) United States Patent
Zhang

(10) Patent No.: US 10,018,106 B2
(45) Date of Patent: Jul. 10, 2018

(54) ENGINE SYSTEM WITH ROTATABLE INTAKE PORT

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 15/331,590

(22) Filed: Oct. 21, 2016

(65) Prior Publication Data
US 2018/0112587 A1    Apr. 26, 2018

(51) Int. Cl.
F02B 31/06    (2006.01)
F02M 35/10    (2006.01)

(52) U.S. Cl.
CPC ....... F02B 31/06 (2013.01); F02M 35/10118 (2013.01); F02M 35/10262 (2013.01); *F02M 35/10072* (2013.01); *F02M 35/10091* (2013.01)

(58) Field of Classification Search
CPC .......... F02B 31/06; F02M 23/003; F02M 35/10072; F02M 35/10091; F02M 35/10118; F02M 35/10249; F02M 35/10262; F02M 35/10301
See application file for complete search history.

(56) References Cited

U.S. PATENT DOCUMENTS

| 3,442,805 | A | * | 5/1969 | Johnson | C10M 173/02 |
| | | | | | 508/528 |
| 3,884,209 | A | * | 5/1975 | List | F01L 3/06 |
| | | | | | 123/188.14 |
| 4,398,511 | A | * | 8/1983 | Nemazi | F02B 31/06 |
| | | | | | 123/188.14 |
| 4,432,312 | A | * | 2/1984 | Klomp | F01L 3/06 |
| | | | | | 123/188.7 |
| 4,827,833 | A | | 5/1989 | Heyl | |
| 4,850,317 | A | * | 7/1989 | Katsumoto | F02B 31/00 |
| | | | | | 123/188.14 |
| 5,165,374 | A | * | 11/1992 | Chapman | F02B 31/06 |
| | | | | | 123/308 |
| 5,359,972 | A | | 11/1994 | Isaka | |
| 5,379,738 | A | * | 1/1995 | Laimbock | F02B 27/0284 |
| | | | | | 123/308 |
| 5,474,044 | A | | 12/1995 | Matterazzo et al. | |
| 6,006,721 | A | * | 12/1999 | Shannon | F02B 31/06 |
| | | | | | 123/188.14 |
| 2007/0044754 | A1 | | 3/2007 | Peffley et al. | |

FOREIGN PATENT DOCUMENTS

DE    10313293 A1 * 10/2004    .............. F02B 17/00

* cited by examiner

*Primary Examiner* — Erick Solis
*Assistant Examiner* — Anthony L Bacon
(74) *Attorney, Agent, or Firm* — Julia Voutyras; McCoy Russell LLP

(57) ABSTRACT

An engine system is provided. The engine system includes a rotatable intake port circumferentially surrounding at least a portion of a stem of an intake valve coupled to a cylinder, the rotatable intake port having a first curved section extending inward toward or outward from a rotational axis of the rotatable intake port. The engine system further includes an intake port actuator coupled to the rotatable intake port configured to rotate the rotatable intake port about the rotational axis based on engine operating conditions.

20 Claims, 8 Drawing Sheets

FIG. 1
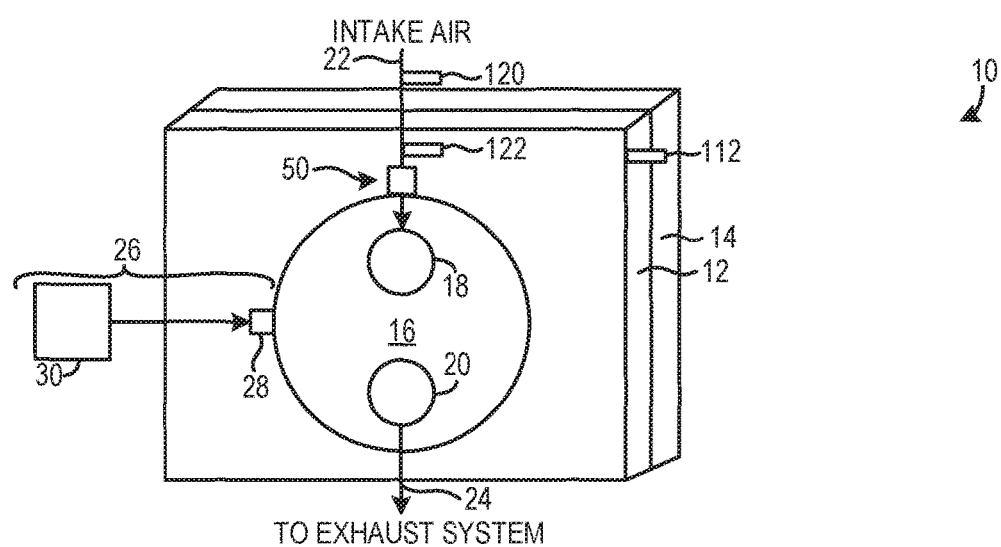
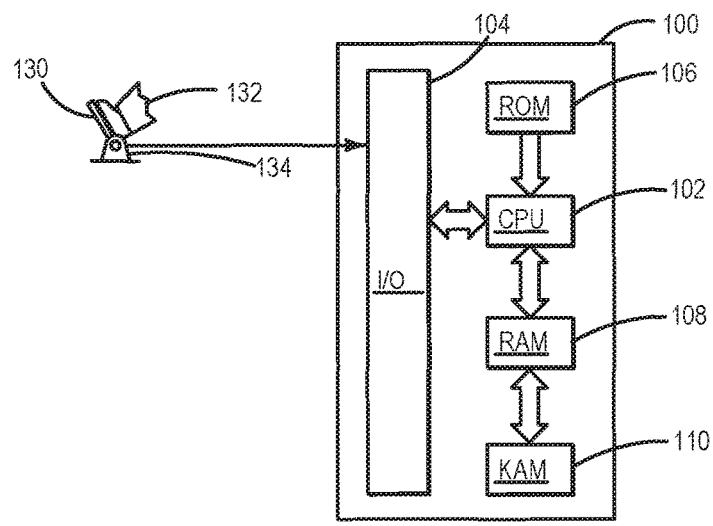

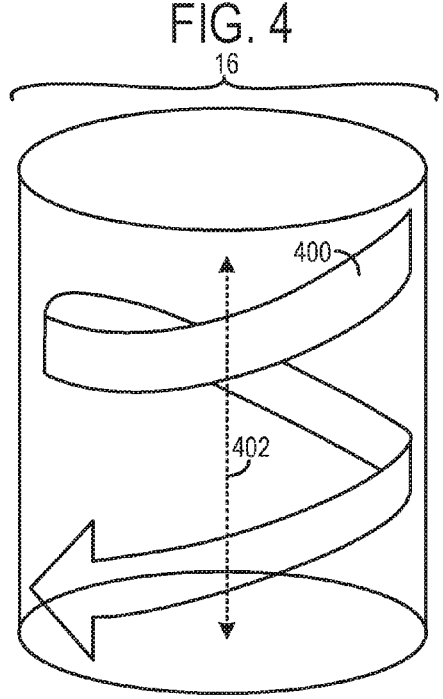 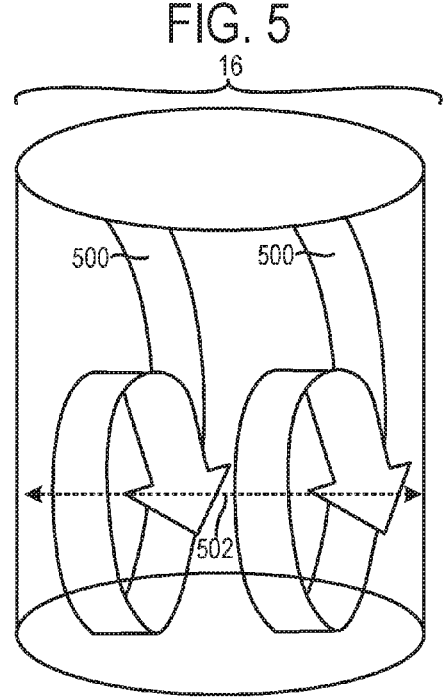
FIG. 4
FIG. 5

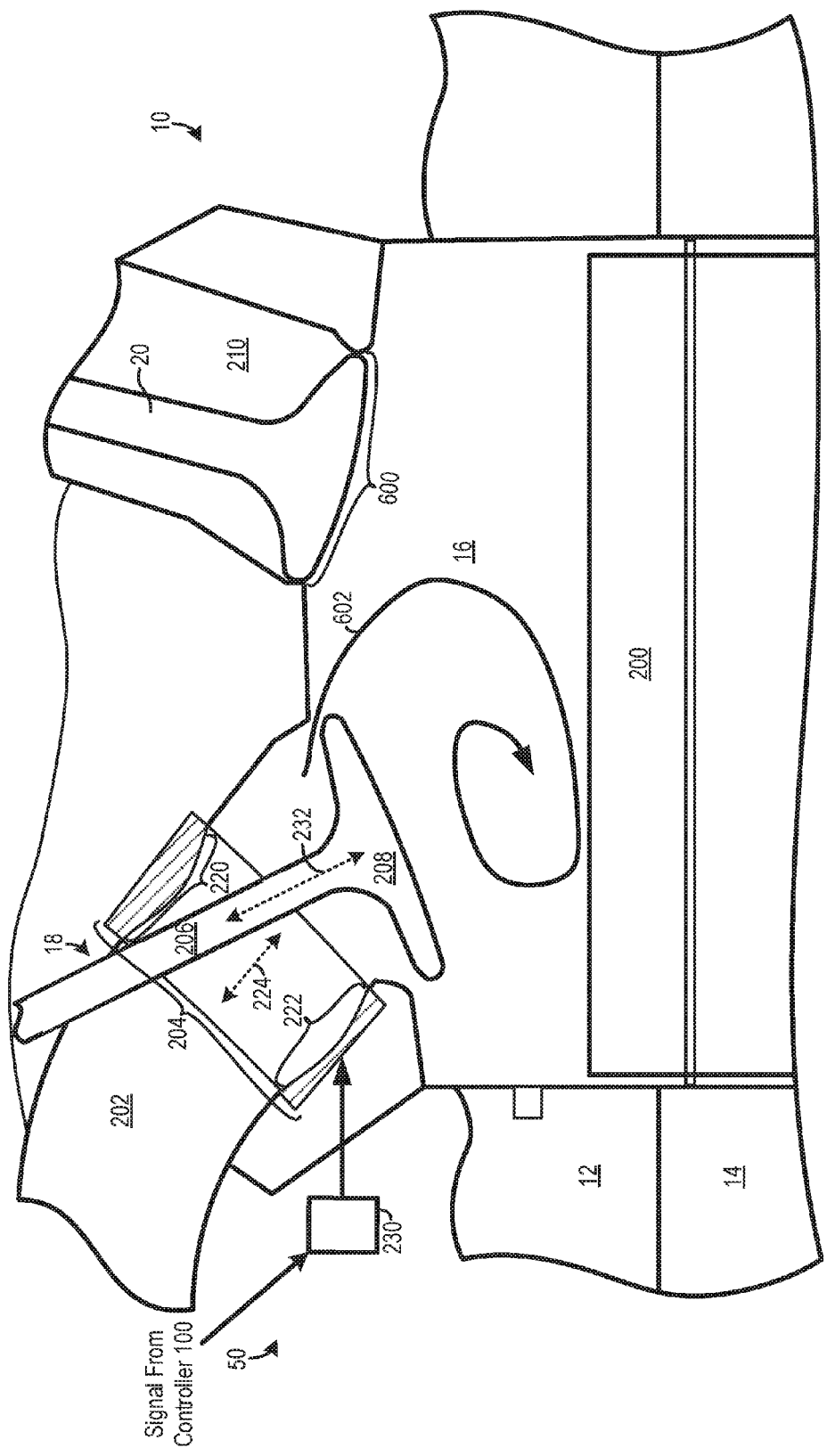

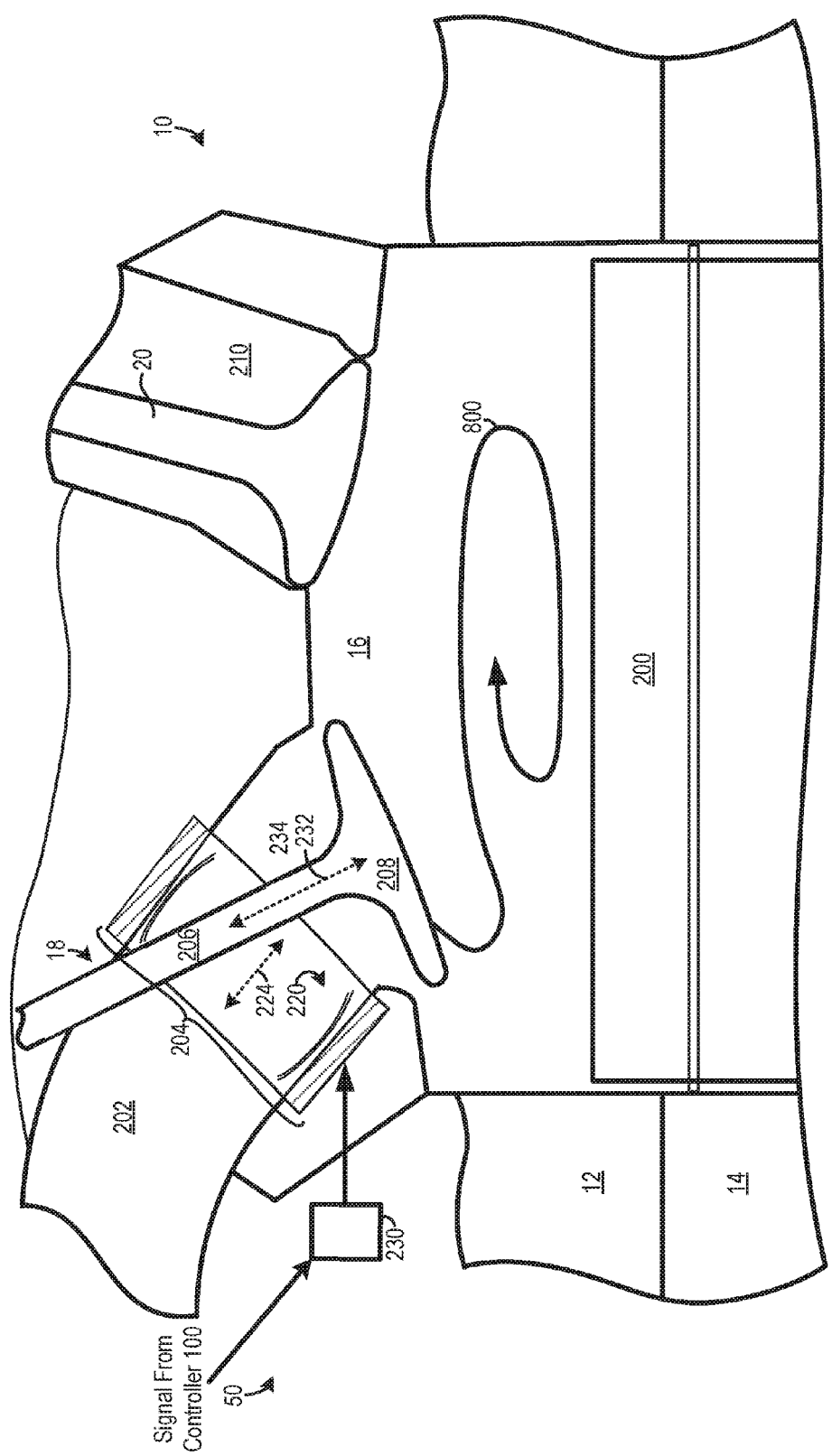

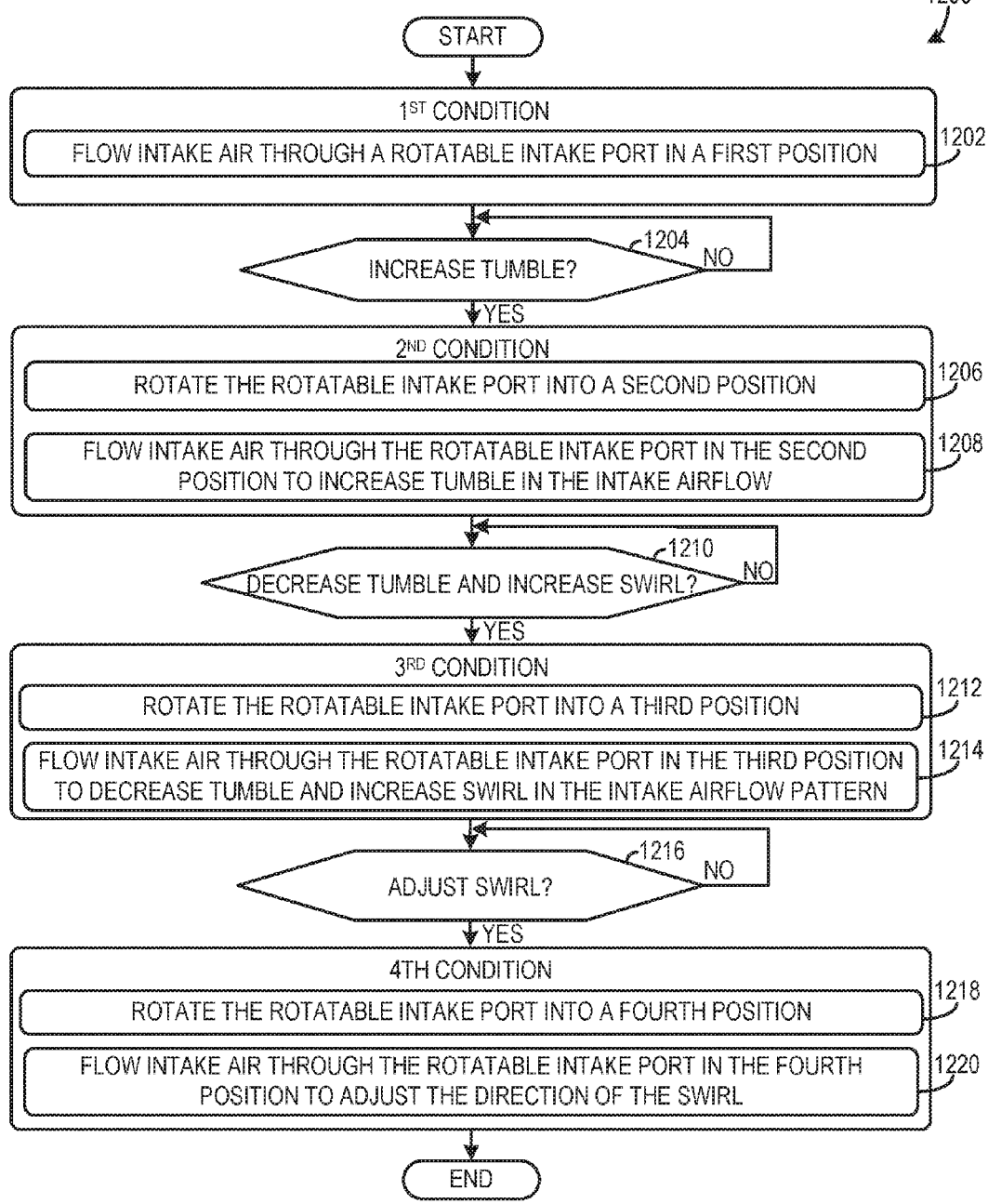

ENGINE SYSTEM WITH ROTATABLE INTAKE PORT

BACKGROUND/SUMMARY

In cylinders of in internal combustion engines combustion characteristics such as efficiency, ignition, and knock are affected by intake airflow patterns. Tumble and swirl patterns characterize different aspects of the turbulence in the cylinder. Tumble and swirl ratios are terms used to quantify these flow patterns. Tumble ratio is defined as the strength of horizontal recirculation of the intake gas in the cylinder while swirl ratio is defined as the strength of vertical recirculation in the cylinder. Tumble and swirl patterns have different influences on various aspects of combustion (e.g., ignition, knock, efficiency, emissions, power, etc.) In previous engines, intake ports are designed to provide set tumble and swirl flow patterns. Therefore, the set patterns in the combustion airflow can negatively impact combustion when the engine is run outside of the ideal operating conditions for the set flow patterns. Attempts have been made to dynamically adjust the tumble and swirl flow patterns for different operating conditions in an engine system with a rotatable flow plate extending into an intake conduit.

However, this type of system only marginally alters airflow patterns and does not enable desired amount of swirl and tumble to be generated within the cylinder during certain operating conditions.

To address at least some of the aforementioned problems, an engine system is provided. The engine system includes a rotatable intake port circumferentially surrounding at least a portion of a stem of an intake valve coupled to a cylinder, the rotatable intake port having a first curved section extending inward toward or outward from a rotational axis of the rotatable intake port. The engine system further includes an intake port actuator coupled to the rotatable intake port configured to rotate the rotatable intake port about the rotational axis based on engine operating conditions. The curved contours of the adjustable intake port are designed to change the turbulence of air entering the cylinder to improve combustion efficiency, reduce knock, increase power, and/or decrease emissions, across a wide range of operating conditions. Thus, the curved intake port section can be rotated to generate a strong imbalance in airflow around an intake valve head to provide desired levels of turbulence in the cylinder that best suit the current operating conditions, if desired.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 shows an illustration of an engine;

FIGS. 4 and 5 show depictions of exemplary swirl and tumble flow patterns in the cylinder shown in FIG. 2;

FIG. 6 shows an exemplary illustration of the engine system shown in FIG. 2 with the rotatable intake port in a second position that increases tumble in the cylinder;

FIG. 8 shows an exemplary illustration of the engine system shown in FIG. 2 with the rotatable intake port in a third position that increases swirl in the cylinder;

FIG. 12 shows a method for operation of an engine system; and

FIGS. 2-11 and 13-14 are drawn approximately to scale, although alternate dimensions have been contemplated.

DETAILED DESCRIPTION

An engine system configured to dynamically adjust intake port and cylinder flow characteristics, such as tumble and swirl ratios of intake airflow is described herein. The engine system includes a rotatable intake port configured to adjust the turbulence of the intake airflow entering a cylinder based on engine operating conditions. This may be achieved by shaping the intake port with a pair of curved sections directing a greater amount of airflow to selected portions of an intake valve head, to generate tumble and/or swirl flow. In one example, the curved sections may extend toward and away from a rotational axis of the intake port and may be positioned on opposing sides of the intake port. Arranging the curved sections in this way enables an increased amount of tumble and/or swirl to be generated in intake airflow when the intake port is rotated into selected positions. These flow patterns are caused by an imbalance in airflow rates around the intake valve brought about by the curved intake port sections. In this way, turbulence of air entering the cylinder can be adjusted based on changing conditions in the engine to improve combustion efficiency, reduce knock, increase power, and/or decrease emissions. The rotatable intake port therefore enables cylinder turbulence adjustments that best suit the current operating conditions to be implemented to increase combustion efficiency and/or reduce emissions.

Figure 2:
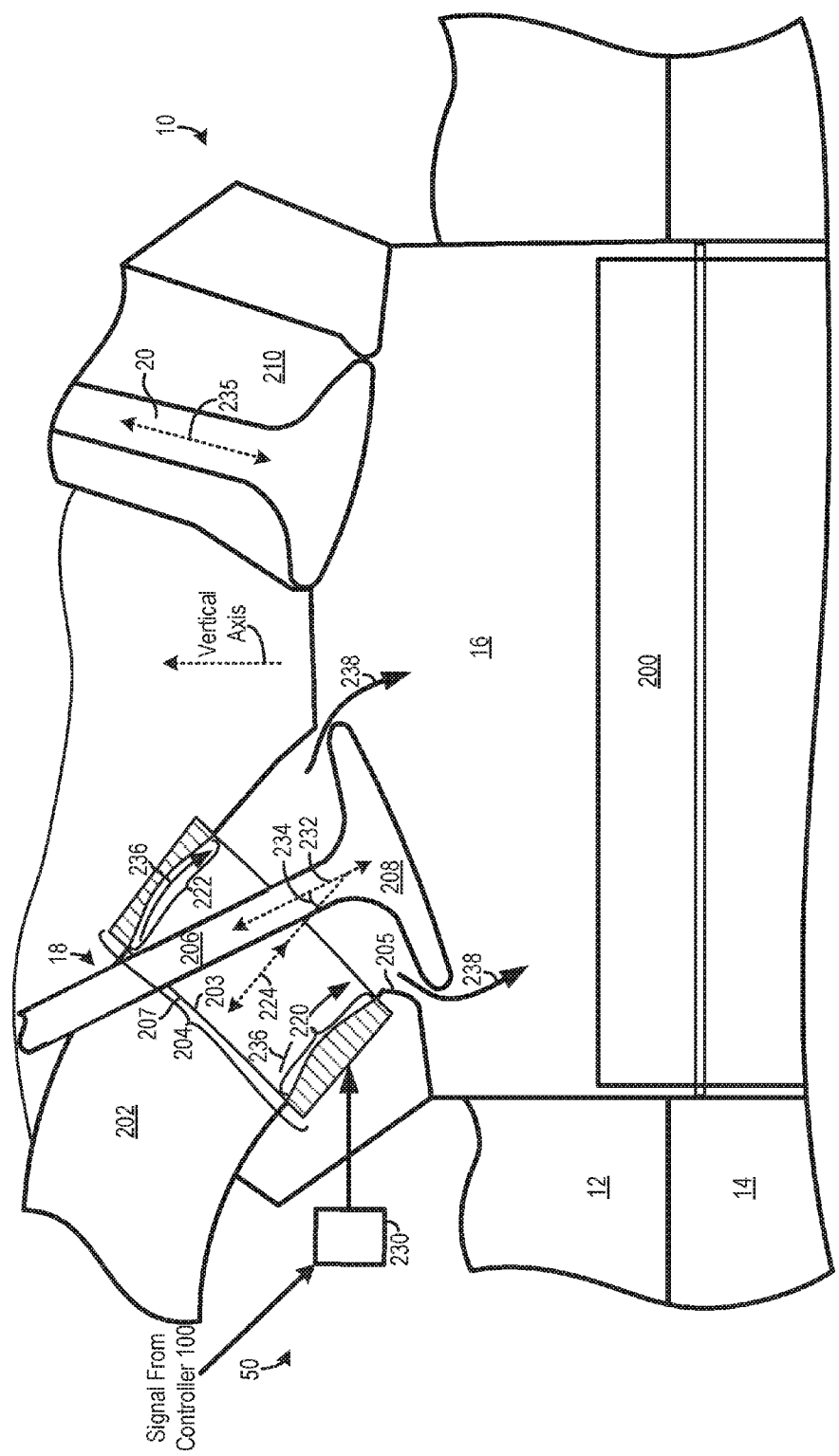
FIG. 2 shows an exemplary illustration of a portion of the engine depicted in FIG. 1 including an engine system having a rotatable intake port in a first position.

In one example, the rotatable intake port is a full section creating a complete cylindrical portion of a port, the section rotating about an axis parallel to the port but with offset or sinusoidal walls and/or an offset axis such that as the portion rotates, walls that protrude into and extend away from the central axis are moved around the rotational axis such that they direct flow in different directions, such as toward one side and the other of the combustion chamber (at first and second positions 180 degrees of rotation apart), and toward a front and back of the combustion chamber (at third and fourth positions 180 degrees or rotation apart, but offset 90 degrees from the first and second positions), in the situation where the port is on one side of the chamber (left/right) but centered (front/back), such as in FIG. 2 in the situation of two valves per cylinder. Alternatively, the port may be offset both left and right, and front to back, such as where four valves per cylinder are utilized. In one example, the interior surface of the section smoothly transitions to the remainder of the port both at its upstream circular edge and its downstream circular edge, even as it rotates a full 360 degrees. In one example, the interior surface can be referred to as a modified cylinder with its midsection offset, but its upper and lower ends not offset, from a central axis, even while each and every cross-section of the cylinder is still the same shape, such as a circle.

FIG. 1 shows a schematic depiction of an engine 10 used to provide motive power to a vehicle, for example. In the depicted example, the engine 10 includes a cylinder head 12 coupled to a cylinder block 14 forming a cylinder 16. The engine 10 is configured to implement combustion operation in a cylinder 16. An intake valve 18 is provided in the engine 10 to flow intake air into the cylinder 16 at selected time intervals. Correspondingly, an exhaust valve 20 is provided in the engine 10 to flow exhaust gas out of the cylinder into a downstream exhaust system at selected time intervals.

Arrow 22 represents the flow of intake air from upstream intake system components such as intake conduits, an intake manifold, a throttle, a compressor, etc., to the intake valve 18. On the other hand, arrow 24 represents the flow of exhaust gas to downstream components such as exhaust conduits, an exhaust manifold, emission control device(s), a turbine, etc., from the exhaust valve 20.

A fuel delivery system 26 is also provided in the engine 10. The fuel delivery system 26 is configured to provide fuel for combustion in the cylinder 16 at desired time intervals. The fuel delivery system 26 includes a direct injector 28, in the illustrated example, and upstream components 30. The upstream components 30, such as fuel pumps, valves, conduits, etc., are configured to provide fuel to the fuel injector 28. However, a port injector configured to deliver fuel into a conduit upstream of the cylinder may be additionally or alternatively included in the fuel delivery system 26. The engine 10 is configured to implement a four stroke combustion cycle in the engine. The combustion strokes include an intake stoke, a compression stroke, a combustion stroke, and an exhaust stroke, described in greater detail herein.

An ignition device (not shown) may also be provided in the engine 10. The ignition device may be configured to provide spark to the cylinder 16 at selected time intervals. However, in other examples the ignition device may be omitted from the engine and the engine may be configured to perform compression ignition.

The engine 10 further includes an engine system 50 configured to adjust the turbulence in the intake air in the cylinder 16. Specifically, the engine system 50 is configured to adjust the tumble and swirl flow patterns in the intake airflow in the cylinder 16 based on engine operating conditions. Adjusting turbulence in the cylinder enables combustion to be improved over a wide range of engine operating conditions. In particular, combustion efficiency can be increased while emissions and knock are reduced when the tumble and swirl patterns in the cylinder are adjusted based on engine operating conditions. The engine system 50 is described in greater detail herein with regard to FIGS. 2-11.

Controller 100 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 100 may receive various signals from sensors coupled to engine 10. For example, the controller 100 may receive measurement of inducted mass airflow (MAF) from a mass airflow sensor 120; engine coolant temperature (ECT) from temperature sensor 112; a profile ignition pickup signal (PIP) from a Hall effect sensor or other type coupled to a crankshaft; throttle position (TP) from a throttle position sensor 134 coupled to a pedal 130 actuated by an operator 132; and absolute manifold pressure signal, MAP, from sensor 122. Engine speed signal, RPM, may be generated by controller 100 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, an engine speed sensor may produce a predetermined number of equally spaced pulses every revolution of the crankshaft.

Controller 100 may be included in a control system configured to receive sensor signals from sensors in the engine and send commands to various actuators in the engine. Moreover, the controller 100 may be configured to implement the methods and other engine control techniques described herein, such as the method depicted in FIG. 12. Specifically, the controller 100 may be configured to command adjustment of a rotatable intake port included in the engine system 50, described in greater detail herein.

Although the engine 10 is depicted as having only a single cylinder, in other examples, the engine 10 may include more than one cylinder with each cylinder having a corresponding engine system including rotatable intake ports, similar to the rotatable intake port, discussed in greater detail herein with regard to FIGS. 2-11. The controller 100 may be configured to independently adjust each of the rotatable intake ports during certain operating conditions and during other operating conditions may be configured to synchronously adjust each of the rotatable intake ports.

FIG. 2 illustrates an exemplary illustration of a portion of the engine 10 including engine system 50 as well as the cylinder block 14, the cylinder head 12, and the cylinder 16. A piston 200 is disposed in the cylinder 16. It will be appreciated that the piston 200 may be rotationally coupled to a crankshaft.

The engine 10 includes an intake passage 202 upstream of a rotatable intake port 204. It will be appreciated that the intake passage 202 receives intake air from upstream components such as an air intake, air filter, throttle, compressor, manifold, etc. In the depicted example, at the intersection of the intake passage 202 and the rotatable intake port 204, the trailing edge 203 of the intake passage 202 is flush with a leading edge 207 of the rotatable intake port 204. However, other port and conduit profiles have been contemplated.

The intake valve 18 extends through the rotatable intake port 204. The intake valve 18 is in an open position in FIG. 2, where intake airflows into the cylinder 16 from the intake port 204. Thus, FIG. 2 illustrates an intake stroke in a combustion cycle. However, when the intake valve 18 is in a closed position the valve seats and seals on a valve seat 205 in the cylinder head 12 to prevent airflow from entering the cylinder 16. Specifically, the intake valve 18 includes a stem 206 and a head 208 configured to seat and seal with valve seat 205 in a closed configuration.

An exhaust passage 210 and the exhaust valve 20 are also included in the section of the engine 10 shown in FIG. 2. The exhaust valve 20 is in a closed position where the exhaust valve 20 is seated and sealed on a portion (e.g., exhaust valve seat) of the cylinder head 12. However, during a portion of the intake stroke the exhaust valve 20 may be opened, if desired.

The intake valve 18 and the exhaust valve 20 may be actuated via a camshaft or electronic actuators. FIG. 2 illustrates the engine during an intake stroke in the combustion cycle. During the intake stroke, generally, the exhaust valve 20 closes and intake valve 18 opens. Air is introduced into cylinder 16 via the rotatable intake port 204, and piston 200 moves to the bottom of the cylinder 16 to increase the volume with the cylinder. The position at which piston 200 is near the bottom of the cylinder and at the end of its stroke (e.g., when cylinder 16 is at its largest volume) is typically referred to by those of skill in the art as bottom dead center (BDC). During the compression stroke, intake valve 18 and exhaust valve 20 are closed. Piston 200 moves toward the cylinder head to compress the air within the cylinder 16. The point at which piston 200 is at the end of its stroke and closest to the cylinder head (e.g., when cylinder 16 is at its smallest volume) is typically referred to by those of skill in the art as top dead center (TDC). In a process hereinafter referred to as injection, fuel is introduced into the cylinder. In a process hereinafter referred to as ignition, the injected fuel is ignited by known ignition means such as spark plug or via compression, resulting in combustion. During the expansion stroke, the expanding gases push piston 200 back to BDC. Finally, during the exhaust stroke, the exhaust valve 20 opens to release the combusted air-fuel mixture to the exhaust system and the piston returns to TDC. Note that the above is shown merely as an example, and that intake and exhaust valve opening and/or closing timings may vary, such as to provide positive or negative valve overlap, late intake valve closing, or various other examples.

Figure 13:
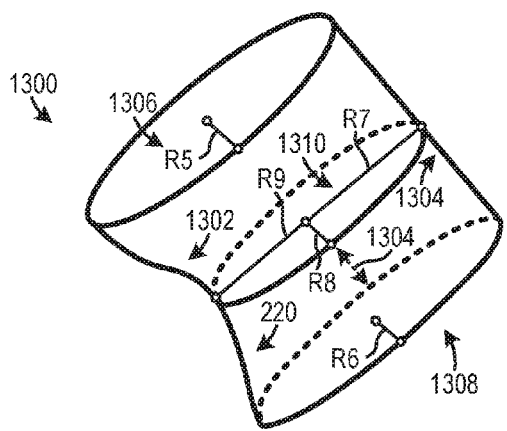
FIGS. 13-14 show additional exemplary configurations of the rotatable intake port.
Figure 14:
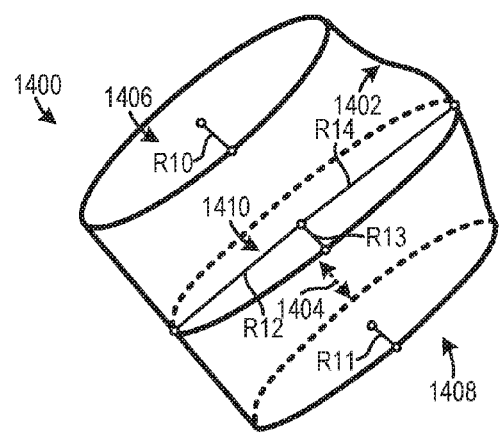

The engine system 50 includes the rotatable intake port 204 downstream of the intake conduit 202. The rotatable intake port 204 includes a first curved section 220 and a second curved section 222. The first curved section 220 and the second curved section 222 are positioned on opposing sides of the rotatable intake port 204, in the illustrated example. However, other relative positions of the curved sections may be used, in other examples. Additionally, the first curved section 220 extends inward toward a rotational axis 224 of the rotatable intake port 204. Conversely, the second curved section 222 extends outward away from the rotational axis 224 of the rotatable intake port 204. However in other examples, the rotatable intake port may have a single inwardly curved section or a single outwardly curved section. When the rotatable intake port includes only a single curved section, the section of the rotatable intake port opposing side of the curved section may have a substantially constant radius along the axial length of the side, in one example. Embodiments of rotatable intake ports with single curved sections are shown in FIGS. 13 and 14 and discussed in greater detail herein. The curved sections 220 and 222 are continuously curved and form arcs protruding toward or away from the intake valve stem 206, in the depicted example. Alternatively, the curved sections may have a stepwise contour.

The curved sections (220 and 222) in the rotatable intake port 204 enables desired tumble and swirl patterns to be generated by the rotatable intake port 204. The angular rotation of the rotatable intake port 204 dictates the strength of the tumble flow patterns and/or swirl flow patterns in the intake air entering the cylinder 16 through the intake valve 18. That is to say that the curved sections in the rotatable intake port 204 cause an imbalance around different portions of the head 208 based on the angular orientation of the rotatable intake port 204.

The engine system 50 also includes an intake port actuator 230 configured to rotate the rotatable intake port 204 about the rotational axis 224. The intake port actuator 230 may include a smaller gear controlled by the rotational electric actuator. The teeth on the small gear may be engaged with the teeth on the outer surface of the rotatable intake port 204. As the smaller gear rotates, the rotatable intake port may also rotate but on a perpendicular plane with different rotational speed which is determined by the tooth ratio between smaller gear and the rotatable intake port. However, other suitable actuation mechanisms have been contemplated. The intake port actuator 230 may receive control signals from the controller 100, shown in FIG. 1. The control signals may command the intake port actuator 230 to rotate the rotatable intake port 204 into different radial orientations based on engine operating conditions. The operating conditions may include one or more of engine power, load, air/fuel ratio, temperature, engine speed, and exhaust gas composition, in one example. The specific conditions that trigger adjustment of the orientation of the rotatable intake port 204 are discussed in greater detail herein.

As shown, the rotational axis 224 of the rotatable intake port 204 intersects a central axis 232 of the intake valve 18 at an angle 234. In the depicted example, the angle 234 is non-straight and less than 90°. Specifically, the angle 234 may be in the range between 30 to 60 degrees. The arrangement of the intake port at this angle enables the swirl and tumble of the cylinder airflow to be adjusted in a desired manner. However, other relative positions of the rotatable intake port and intake valve have been contemplated. Further, the rotational axis 224 may align with a central axis of the intake port at center points of the intake port along which and around which the rotatable intake port is positioned. Further still, the rotational axis 224 may align with a central flow axis through the port. In the arrangement depicted in FIG. 2, the rotatable intake port 204 is in a first position.

The first position corresponds to an angular orientation of the rotatable intake port 204. In the first position the rotatable intake port 204 is arranged such that the second curved section 222 is closer to the exhaust valve 20 than the first curved section 220. Specifically, in one example, when the rotatable intake port 204 is in the first position the first curved section 220 may be at a lowest position with respect to the rotational orientation and a vertical axis. Further in such an example, the second curved section 222 may be at a highest position with respect the rotational orientation and the vertical axis.

Arrows 236 depicts the general direction of intake airflow through the rotatable intake port 204. Arrows 238 show the general direction of intake airflow past the intake valve 18 and in the cylinder 16. It will be appreciated that the differences between airflow rates around different sections of the intake valve head 208, shown in FIG. 2, may vary by a smaller amount than the other orientations of the rotatable intake port 204 shown in FIGS. 6, 8, and 10. When the airflow rates are not highly divergent, only a small amount of tumble and swirl may be generated, as is the case in the airflow pattern depicted in FIG. 2.

Figure 3:
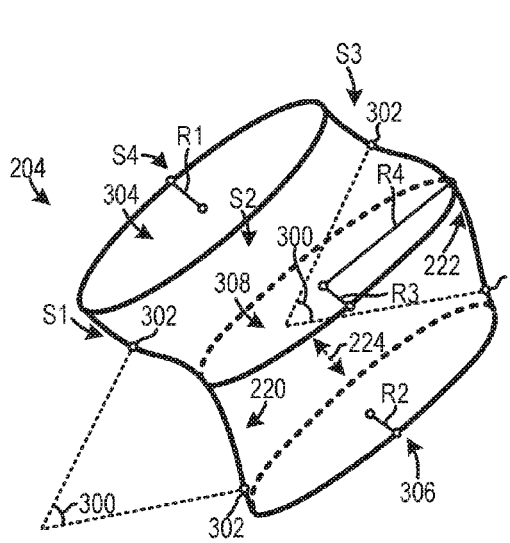
FIG. 3 is a detailed illustration of the rotatable intake port shown in FIG. 2.

FIG. 3 shows a detailed view of the rotatable intake port 204 in the first position. The first curved section 220 and the second curved section 222 included in the rotatable intake port 204 are shown in FIG. 3. The rotational axis 224 is also provided for reference. Different sides S1, S2, S3, and S4 of the rotatable intake port 204 are depicted to enable the orientation of the rotatable intake port 204 to be clearly discerned. As shown, the first curved section 220 is on the side S1 and the second curved section 222 is positioned on the opposing side S3. Furthermore, each of the first curved section 220 and the second curved section 222 are similarly curved. That is to say that the degree of curvature of the first curved section 220 is equivalent to the degree of curvature of the second curved section 222. Each degree of curvature is defined as a central angle 300 measured from ends 302 of the arc of each respective curved section. However, in other examples the first and second curved sections may have differing degrees of curvature. For instance, the first curved section 220 may have a greater degree of curvature than the second curved section 222, or vice versa.

It will be appreciated that the sides S2 and S4 do not curve inward or outward along their lengths. In particular, the sides S2 and S4 may have constant radii measured from the rotational axis 224 along their lengths. In this way, the sides S2 and S4 do not have a large affect on the tumble and swirl intake airflow patterns. On the other hand, radii of the sides S1 and S3 along their lengths vary to provide the turbulence inducing contours of the first curved section 220 and the second curved section 222.

Various radii are also illustrated in FIG. 3 to further describe the geometric features of the rotatable intake port 204. As illustrated, an upstream end 304 of the rotatable intake port 204 includes a first radius R1. A downstream end 306 of the rotatable intake port 204 includes a second radius R2. Additionally, a middle section 308 of the rotatable intake port 204 includes a third radius R3 aligned with the second side S2 and the fourth side S4 and a fourth radius R4 aligned with the first side S1 and the third side S3.

The upstream end 304 and downstream end 306 both have a constant radius. That is to say that the upstream end 304 and the downstream end 306 have a circular radial cross-section. However, in other examples the upstream end and/or downstream end may have a non-circular cross-sectional contour, such as an oval cross-sectional contour, for instance.

In the embodiment depicted in FIG. 3 the first radius R1 is substantially equal to the second radius R2. However, in other examples the first radius R1 may be larger than the $2^{nd}$ radius R2 or vice versa.

Additionally, the third radius R3 and the fourth radius R4 are not equal. Specifically, the third radius R3 may be greater than the fourth radius R4 or vice versa. Additionally, the third radius R3 may less than or greater than the first and second radii R1 and R2, in some examples. However, in other examples the third radius R3 may be equal to the first and second radii R1 and R2. Furthermore, the fourth radius R4 may be greater than or less than the first and second radii R1 and R2. However, in other examples the fourth radius R4 may be equal to the first and second radii R1 and R2. It will be appreciated that these different configurations can enable the intake port to generate different amounts of swirl and/or tumble airflow.

When the third radius R3 or fourth radius R4 is greater than the first and second radii R1 and R2, the area of the radial cross-section of the middle section 308 may be greater than the area of the radial cross-section of the upstream end 304 and the downstream end 306. However, in other examples the area of the radial cross-sections of the middle section 308 may be less than the area of the radial cross-section of the upstream end 304 and/or the downstream end 306.

Additionally, the middle section 308 is axially offset from the upstream end 304 and the downstream end 306. Arranging the middle section in this way enables the curvature of different sides of the intake port to be correspondingly curved.

It will be appreciated that the rotatable intake port 204 with one or more curved sections enables a large amount of tumble and/or swirl to be generated in airflow entering the cylinder. The amount of tumble and/or swirl generated by the rotatable intake port 204 is greater than previous tumble generating devices, due to the entire conduit being involved in the generation of the tumble and swirl airflow patterns as opposed to small flow deflectors provided in previous intake systems.

FIGS. 4 and 5 show the cylinder 16 with exemplary swirl and tumble flow patterns, providing visual references of the flow patterns. The cylinder head 12 and cylinder block 14, shown in FIG. 2, form the cylinder 16 that is illustrated in FIGS. 4-5. It will be appreciated that the actual airflow patterns generated in the cylinder may have greater complexity than the patterns depicted in FIGS. 4 and 5. For instance, the airflow in the cylinder may exhibit both swirl and tumble characteristics. Thus, the patterns depicted in FIGS. 4 and 5 illustrate modeled swirl and tumble flow patterns for reference.

Specifically, FIG. 4 shows an example depiction of the cylinder 16 with a swirl type airflow pattern. Arrow 400 depicts the general direction of airflow in the cylinder 16. A swirl ratio defined as the strength of vertical recirculation may be used to quantify this type of airflow pattern. A vertical axis 402 around which the air circulates is provided for reference. The swirl direction in FIG. 4 is in a clockwise direction. However, in other examples the swirl direction may be in a counter-clockwise direction. It may be desirable to generate swirl in the cylinder 16 during engine cold start and idle conditions to reduce (e.g., prevent) fuel spray impingement on cylinder wall.

Figure 10:
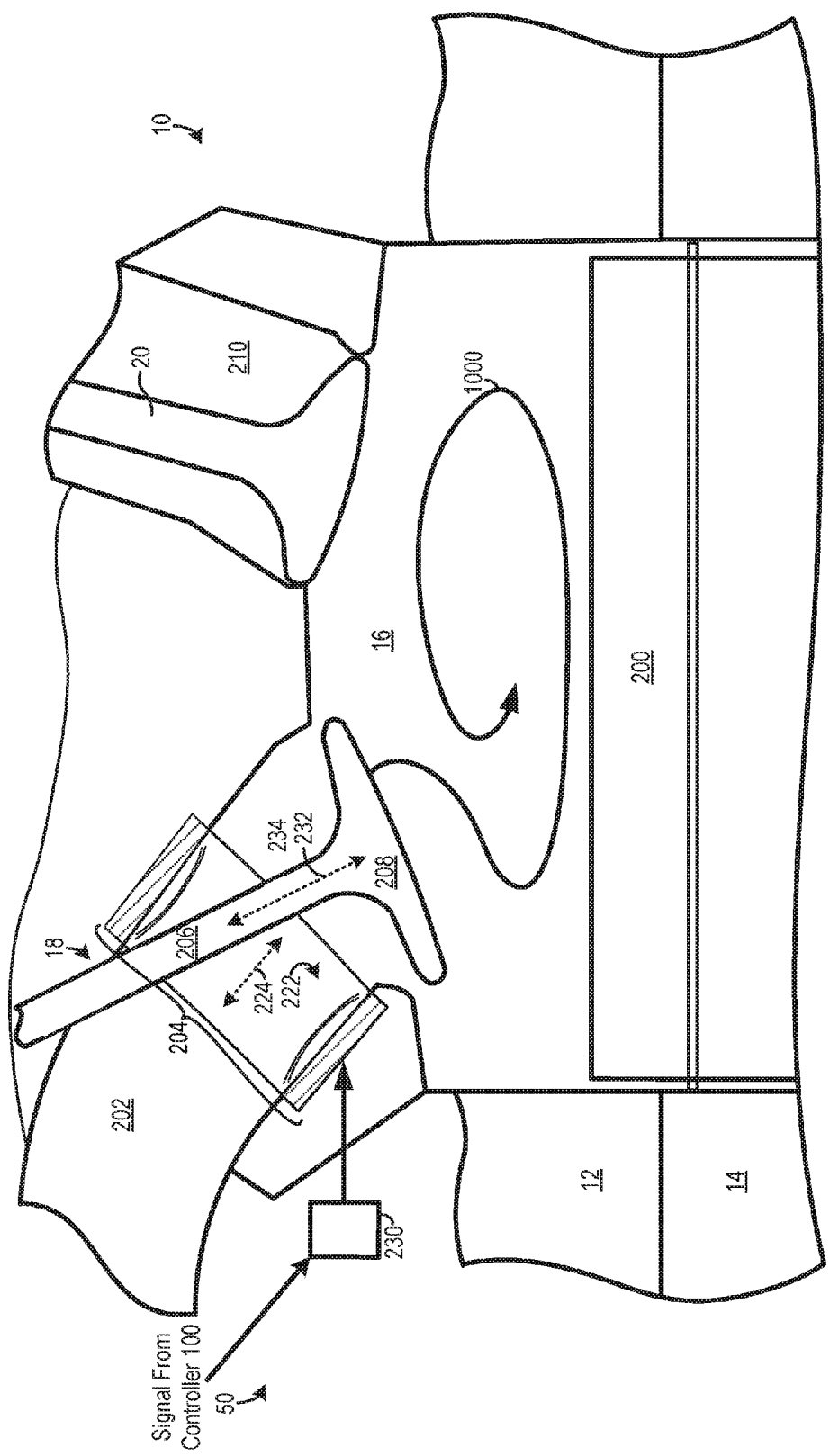
FIG. 10 shows an exemplary illustration of the engine system shown in FIG. 2 with the rotatable intake port in a fourth position that changes a direction of the swirl in the cylinder.

FIG. 5 shows an illustration of the cylinder 16 with a tumble type airflow pattern. Arrows 500 depicts the general direction of airflow in the cylinder 16. A tumble ratio, defined as the strength of horizontal recirculation, can be used to quantify this type of airflow pattern. A horizontal axis 502 around which the air circulates is provided for reference. It may be desirable to generate tumble in the cylinder 16 during engine operates at high (e.g., peak) power and high load condition. At engine light to mid load conditions, both swirling and tumble flow is desired for improved (e.g., optimum) air/fuel motion in the cylinder. FIGS. 6, 8, and 10 illustrated the rotatable intake port 204 in the engine system 50 in different positions configured to generate an increased amount of swirl and/or tumble when compared to the first position of the rotatable intake port 204, position shown in FIG. 2. The flow altering surface positions in FIGS. 6, 8, and 10 are rotated away from the first position, depicted in FIG. 2, to adjust the swirl and tumble ratios of the airflow to improve combustion operation.

FIG. 6 shows the engine 10 and engine system 50 with the rotatable intake port 204 in a second position. The second position is associated with an angular orientation about the rotational axis 224 different from the angular orientations of the other intake port positions described herein. In the illustrative example, the rotatable intake port 224 is oriented such that the first curved section 220 is positioned closer to the exhaust valve 20 than the second curved section 222. It will be appreciated that an exhaust valve head 600 may be used as a point of reference on the exhaust valve 20 to make this comparison. However, in other examples a point on the central axis 235 of the exhaust valve 20 may be used as the point of reference for such a comparison. In one example, in the second position the rotatable intake port 204 is angularly separated by 180° from the first position of the rotatable intake port 204 shown in FIG. 2. Arrow 602 depicts the general pattern of airflow entering the cylinder 16 through the intake valve 18. In the second position the rotatable intake port 204 generates an airflow pattern in air entering the cylinder 16 with a greater tumble ratio than the tumble ratio of the airflow pattern generated by the rotatable intake port 204 in the first position, shown in FIG. 2. Therefore, rotating the rotatable intake port 204 into the second position from the first position increases the tumble ratio of the airflow entering the cylinder 16. In one example, the rotatable intake port 204 may be rotated into the second position when the engine speed surpasses a threshold value indicating a high speed or load condition. Correspondingly, the rotatable intake port 204 may be rotated into the first position when the engine speed drops below the aforementioned engine speed threshold value. The intake passage 202, exhaust passage 210, intake port actuator 230, cylinder block 14, cylinder head 12, and piston 200 are also illustrated in FIG. 6 for reference.

Figure 7:
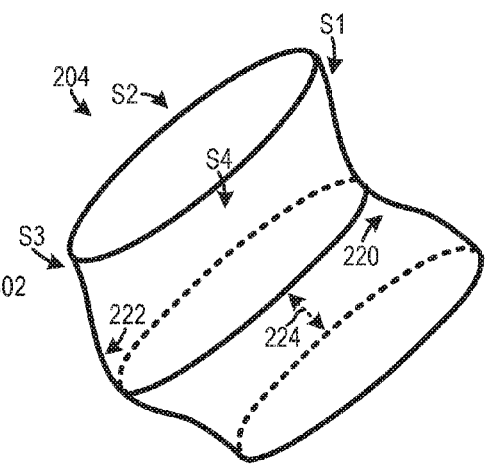
FIG. 7 is a detailed illustration of the rotatable intake port shown in FIG. 6.

FIG. 7 shows a detailed view of the rotatable intake port 204 in the second position. The first curved section 220 and the second curved section 222 included in the rotatable intake port 204 are shown in FIG. 7. The rotational axis 224 and the different sides S1, S2, S3, and S4 of the rotatable intake port 204 are depicted to enable the orientation of the second position of the rotatable intake port 204 to be clearly discerned. As shown, the first curved section 220 is on the side S1 and the second curved section 222 is positioned on the opposing side S3. It will be appreciated that the second position of the rotatable intake port 204, shown in FIG. 7 has been rotated 180° away from the first position of the rotatable intake port 204, shown in FIG. 3.

FIG. 8 shows the engine 10 and engine system 50 with the rotatable intake port 204 in a third position. In the illustrative example, the rotatable intake port 204 is angularly separated by 90° in a clockwise direction with respect to the first position of the rotatable intake port 204 shown in FIG. 2. Arrow 800 depicts the general pattern of airflow entering the cylinder 16 through the intake valve 18. In the third position the rotatable intake port 204 generates an airflow pattern in air entering the cylinder 16 with a greater swirl ratio than the swirl ratio of the airflow pattern generated by the rotatable intake port 204 in the first or second positions. Therefore, rotating the rotatable intake port 204 into the third position from the first position or the second position increases the swirl ratio of the airflow entering the cylinder 16. Furthermore, in the third position the rotatable intake port 204 generates airflow with a smaller tumble ratio than the tumble ratio of the airflow pattern generated by the rotatable intake port 204 in the first or second positions. As such, rotating the rotatable intake port 204 into the third position from the first position or second position decreases the tumble ratio of the airflow entering the cylinder 16. The intake passage 202, exhaust passage 210, cylinder block 14, cylinder head 12, and piston 200 are also illustrated in FIG. 8 for reference.

Figure 9:
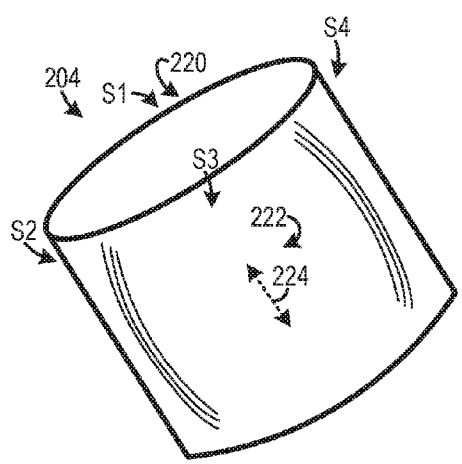
FIG. 9 is a detailed illustration of the rotatable intake port shown in FIG. 8.

FIG. 9 shows a detailed view of the rotatable intake port 204 in the third position. The first curved section 220 and the second curved section 222 included in the rotatable intake port 204 is shown in FIG. 9. The rotational axis 224 and sides S1, S2, S3, and S4 are also provided for reference. The first curved section 220 is on the side S1 and the second curved section 222 is positioned on the opposing side S3. In the third position the rotatable intake port 224 may be oriented such that the first curved section 220 and the second curved section 222 are substantially equidistant from the exhaust valve 20, shown in FIG. 8. Arranging the curved sections in this manner enables an increase in swirl ratio and a decrease in tumble ratio in the cylinder airflow to be achieved.

FIG. 10 shows the engine 10 and engine system 50 with the rotatable intake port 204 in a fourth position. In the illustrative example, the rotatable intake port 204 is rotated by 90° in a counter-clockwise direction with respect to the first position of the rotatable intake port 204 shown in FIG. 2. Arrow 1000 depicts the general pattern of airflow entering the cylinder 16 through the intake valve 18. In the fourth position the rotatable intake port 204 generates an airflow pattern in air entering the cylinder 16 that is similar to the airflow pattern generated by the rotatable intake port 204 in the third position. Thus, when the rotatable intake port 204 is rotated into the fourth position from the first or second positions the swirl ratio of the airflow is increased and the tumble ratio of the airflow is decreased. However, in the fourth position the rotatable intake port 204 generates an airflow pattern in air entering the cylinder 16 with a direction of swirl that opposes the direction of swirl in the airflow pattern in air entering the cylinder when the rotatable intake port is in the third position. Specifically, the general direction of the swirl pattern generated by the rotatable intake port 204 in the fourth position is clockwise while the general direction of the swirl pattern generated by the rotatable intake port 204 in the third position is counter-clockwise.

In one example, the rotatable intake port 204 may be rotated into the third or fourth position when the engine is below a threshold temperature indicating a cold start and/or a speed indicating an idle condition. The intake passage 202, exhaust passage 210, intake port actuator 230, cylinder block 14, cylinder head 12, and piston 200 are also illustrated in FIG. 10 for reference.

Figure 11:
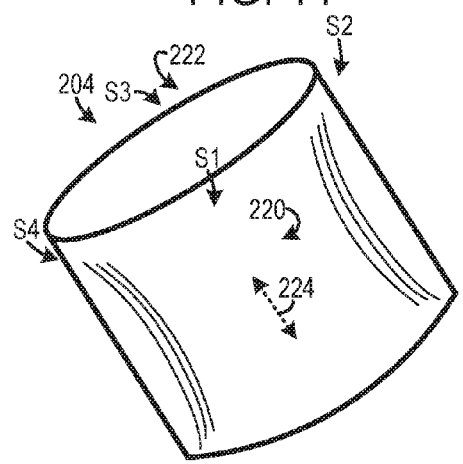
FIG. 11 is a detailed illustration of the rotatable intake port shown in FIG. 10.

FIG. 11 shows a detailed view of the rotatable intake port 204 in the fourth position. The first curved section 220 and the second curved section 222 included in the rotatable intake port 204 are shown in FIG. 11. The rotational axis 224 and sides S1, S2, S3, and S4 are also provided for reference. In the fourth position the rotatable intake port 224 may also be oriented such that the first curved section 220 and the second curved section 222 are substantially equidistant from the exhaust valve 20, shown in FIG. 10.

The different intake port orientations shown in FIGS. 2, 6, 8, and 10 enable swirl and tumble airflow patterns to be independently adjusted to achieve desired tumble and swirl ratios. As such, the airflow pattern in air entering and within the cylinder can be finely tuned to achieve improved combustion efficiency and/or decreased emissions. Furthermore, the rotatable intake port 204 may be rotated into additional orientations, such as 45° in a clockwise or counter-clockwise direction from any of the orientations to achieve differing levels of swirl and/or tumble in the intake air entering the cylinder. For instance, the rotatable intake port may be rotated away from the first positon in a clockwise direction by 45° to increase the swirl ratio in the airflow pattern and provide an airflow pattern with a more balanced tumble and swirl ratio.

FIGS. 13 and 14 depict other examples of a rotatable intake port having only a single curved section. It will be appreciated that the rotatable intake ports shown in FIGS. 13 and 14 may be included in the engine system 50 shown in FIGS. 1, 2, 6, 8, and 10. As such, the rotatable intake ports shown in FIGS. 13 and 14 may be rotated into different orientations that generate selected amounts of swirl and/or tumble based on engine operating conditions. Specifically, FIG. 13 depicts an embodiment of the rotatable intake port 1300 with a curved section 1302 extending inwardly toward a rotational axis 1304 of the rotatable intake port 1300. An upstream end 1306 of the rotatable intake port 1300 has a radius R5 and a downstream end 1308 of the rotatable intake port 1300 has a radius R6. As in previous embodiments of the rotatable intake port the upstream and downstream ends have constant radii. The rotatable intake port 1300 also includes a middle section 1310. The middle section 1310 has three radii, R7, R8, and R9. The radius R9 may be equal to the radius R5 and the radius R6, in one example. The radius R8 may be equal to R5 and R6, in one additional example. Further in one instance, the radius R9 may be less than the radius R7. As such, the middle section 1310 may have an oval profile in a radial cross-section.

FIG. 14 depicts an embodiment of the rotatable intake port 1400 with a curved section 1402 that curves outwardly away from a rotational axis 1404 of the rotational intake port 1400. The rotatable intake port 1400 includes an upstream end 1406 with a radius R10 and a downstream end 1408 with a radius R11. As in previous embodiments of the rotatable intake port the upstream and downstream ends have constant radii. The rotatable intake port 1400 also includes a middle section 1410. The middle section 1410 has three radii R12, R13, and R14. The radius R12 may be equal to the radius R10 and R11, in one instance. Additionally, the radius R8 may be equal to R5 and R6, in one example. Additionally, the radius R13 may be equal to radius R12, in one example. The radius R9 may be less than the radius R7. As such, the middle section 1310 may have an oval profile in a radial cross-section.

The curved sections in the rotatable intake ports shown in FIGS. 13 and 14 enable a desired amount of swirl and tumble to be generated in the intake airflow entering the cylinder based on engine operating conditions to improve air-fuel mixing. It will be appreciated that the amounts of swirl and/or tumble may be dictated by the orientation (e.g., rotated position) of the intake port. As a result, combustion efficiency can be increased and engine emissions can be reduced.

FIG. 12 shows a method 1200 for operation of an engine system. The engine system discussed above with regard to FIGS. 1-11 may be used to implement the method 1200, in one example. However in other examples, other suitable engine systems may be used to implement the method 1200.

At 1202 the method includes, during a first operating condition, flowing intake air through a rotatable intake port in a first position. In one example, the rotatable intake port circumferentially surrounds at least a portion of an intake valve stem of an intake valve coupled to a cylinder and having a first curved section extending inward toward a rotational axis of the rotatable intake port and a second curved section extending outward from the rotational axis. Further in one example, the second curved section is closer to an exhaust valve coupled to the cylinder than the first curved section in the first position. However, other curved section positions have been contemplated.

Next at 1204 the method determines if it is desirable to increase tumble of the airflow entering the cylinder. If it is determined that it is not desirable to increase the tumble of the airflow entering the cylinder (NO at 1204) the method returns to 1204. However, if it is determined that it is desirable to increase the tumble of the airflow entering the cylinder (YES at 1204) the method advances to 1206.

At 1206 the method includes, during a second operating condition, rotating the rotatable intake port into a second position. In one example, the first curved section is closer to the exhaust valve than the second curved section in the second position. At 1208 the method includes, during the second operating condition, flowing intake air through the rotatable intake port in the second position to increase tumble in the intake airflow entering the cylinder through the intake valve. The second position enables tumble patterns in the intake airflow to be increased to improve combustion efficiency and reduce emissions during selected engine operating conditions. It will be appreciated that increase the tumble flow pattern in the intake air increased the imbalance of airflow around the head of the intake valve.

Next at 1210 the method includes determining if it is desirable to decrease tumble and increase swirl of the airflow entering the cylinder. If it is determined that it is not desirable to decrease tumble and increase swirl of the airflow entering the cylinder (NO at 1210) the method returns to 1210. However, if it is determined that it is desirable to decrease tumble and increase swirl of airflow entering the cylinder (YES at 1210) the method advances to 1212. At 1212 the method includes, during a third operating condition, rotating the rotatable intake port into a third position. Specifically in one example, the rotatable intake port is rotated by 90° in a clockwise direction from the second position into the third position. In such an example, the first and second curved sections may be substantially equidistant from the exhaust valve of the cylinder. At 1214, during the third operating condition, the method includes flowing intake air through the rotatable intake port in the third position to decrease tumble and increase swirl in the intake airflow pattern. In one example, the swirl airflow pattern generated in the third position may be in a counter-clockwise direction with respect to a vertical axis of the cylinder.

Next at 1216 the method includes determining if it is desirable to adjust the swirl flow pattern in the cylinder. If it is determined that it is not desirable to adjust the swirl of the airflow entering the cylinder (NO at 1216) the method returns to 1216. However, if it is determined that it is desirable to adjust the swirl of airflow entering the cylinder (YES at 1216) the method advances to 1218 where the method includes, during a fourth operating condition, rotating the rotatable intake port into a fourth position. Specifically in one example, the rotatable intake port is rotated by 180° in a clockwise direction from the third position into the fourth position. In such an example, the first and second curved sections may be substantially equidistant from the exhaust valve of the cylinder. At 1220 the method includes flowing intake air through the rotatable intake port in the fourth position to adjust the direction of the swirl. Specifically in one example, flowing intake air through the rotatable intake port in the fourth position reverses the direction of the swirl airflow pattern in intake airflow entering the cylinder. For instance, in the fourth position the direction of swirl may be in a clockwise direction as opposed to a counter-clockwise direction of swirl in the third position.

Further in one example, the first operating condition is when engine speed is below a threshold value and the second operating conditions is when engine speed is greater than a threshold value. Still further in some examples, the tumble ratio of the airflow in the cylinder may be increased when engine operates at or near its full load or peak power conditions. Additionally in some examples, the swirl ratio of the airflow in the cylinder may be increased when the engine is operating under cold start or idle conditions. In yet another example, the tumble ratio may be increased and the swirl ratio of the airflow in the cylinder may be decreased when the engine operates at it high load condition. Conversely, tumble ratio may be decreased and the swirl ratio of the airflow in the cylinder may be increased when the engine operates under an idle condition. Therefore in one example, the tumble and swirl ratio may be adjusted based on one or more of engine power, load, air/fuel ratio, temperature, engine speed, and exhaust gas composition.

The subject matter of the present disclosure is further described in the following paragraphs. According to one aspect, an engine system is provided. The engine system includes a rotatable intake port circumferentially surrounding at least a portion of a stem of an intake valve coupled to a cylinder, the rotatable intake port having a first curved section extending inward toward or outward from a rotational axis of the rotatable intake port and an intake port actuator coupled to the rotatable intake port configured to rotate the rotatable intake port about the rotational axis based on engine operating conditions.

According to another aspect, an engine system in an engine is provided. The engine system includes a rotatable intake port circumferentially surrounding at least a portion of an intake valve stem of an intake valve coupled to a cylinder, the rotatable intake port having a first curved section extending inward toward a rotational axis of the rotatable intake port and a second curved section extending outward from the rotational axis and an intake port actuator coupled to the rotatable intake port configured to rotate the rotatable intake port about the rotational axis based on engine operating conditions to generate an airflow pattern in intake air entering the cylinder through the intake valve with selected tumble ratios and swirl ratios.

According to another aspect, a method for operating an engine system is provided. The method includes during a first operating condition, flowing intake air through a rotatable intake port in a first position, the rotatable intake port circumferentially surrounding at least a portion of an intake valve stem of an intake valve coupled to a cylinder and having a first curved section extending inward toward a rotational axis of the rotatable intake port and a second curved section extending outward from the rotational axis and during a second operating condition, flowing intake air through the rotatable intake port in a second position, where the first position generates an airflow pattern in air entering the cylinder through the intake valve with a greater tumble ratio than a tumble ratio of an airflow pattern in air entering the cylinder through the intake valve generated by the second position.

In any of the aspects described herein or combinations of the aspects, the rotatable intake port may include a second curved section positioned on an opposing side of the rotatable intake port with respect to the first curved section.

In any of the aspects described herein or combinations of the aspects, the second curved section may extend outward from the rotational axis and the first curved section may extend inward toward the rotational axis.

In any of the aspects described herein or combinations of the aspects, the intake port actuator may be configured to rotate the rotatable intake port into a first position where the second curved section is closer to an exhaust valve coupled to the cylinder than the first curved section and rotate the rotatable intake port into a second position where the first curved section is closer to the exhaust valve than the second curved section.

In any of the aspects described herein or combinations of the aspects, the rotatable intake port in second position may generate an airflow pattern in air entering the cylinder through the intake valve with a greater tumble ratio than a tumble ratio of an airflow pattern in air entering the cylinder through the intake valve generated by the rotatable intake port in the first position.

In any of the aspects described herein or combinations of the aspects, the first position and the second position may be angularly separated by 180° with respect to the rotational axis. In any of the aspects described herein or combinations of the aspects, the intake port actuator may be configured to rotate the rotatable intake port into a third position where the rotatable intake port is rotated by 90° in a clockwise direction with respect to the first position and where the third position generates an airflow pattern in air entering the cylinder through the intake valve with a greater swirl ratio than a tumble ratio.

In any of the aspects described herein or combinations of the aspects, the intake port actuator may be configured to rotate the rotatable intake port into a fourth position where the rotatable intake port is rotated by 90° in a counter-clockwise direction with respect to the first position, where the fourth position generates an airflow pattern in air entering the cylinder through the intake valve with a greater swirl ratio than a tumble ratio.

In any of the aspects described herein or combinations of the aspects, a direction of the swirl flow pattern generated by the rotatable intake port in the third position may oppose to a direction of the swirl flow pattern generated by the rotatable intake port in the fourth position.

In any of the aspects described herein or combinations of the aspects, the intake port actuator may be configured to rotate the rotatable intake port into a first, second, third, and fourth position, the first second, third, and fourth positions generating airflow patterns in air entering the cylinder through the intake valve with different tumble ratios and swirl ratios.

In any of the aspects described herein or combinations of the aspects, the first positon and the second position may be angularly separated by 180° with respect to the rotational axis.

In any of the aspects described herein or combinations of the aspects, the third and fourth positions may be angularly separated by 180° with respect to the rotational axis, the first, second, third and fourth positions having distinct angular orientations.

In any of the aspects described herein or combinations of the aspects, the first curved section and the second curved section may be positioned on opposing sides of the rotatable intake port.

In any of the aspects described herein or combinations of the aspects, in the first position the second curved section may be closer to an exhaust valve coupled to the cylinder than the first curved section and in the second position the first curved section may be closer to the exhaust valve than the second curved section.

In any of the aspects described herein or combinations of the aspects, the method may further include, during a third operating condition, flowing intake air through the rotatable intake port in a third position where the rotatable intake port is angularly separated by 90° in a clockwise direction about the rotational axis with respect to the first position and where the rotatable intake port in the third position generates an airflow pattern in air entering the cylinder through the intake valve with a greater swirl ratio than a tumble ratio.

In any of the aspects described herein or combinations of the aspects, the method may further include, during a fourth operating condition, flowing intake air through the rotatable intake port in a fourth position where the rotatable intake port is angularly separated by 90° in a counter-clockwise direction about the rotational axis with respect to the first position and where rotatable intake port in the fourth position generates an airflow pattern in air entering the cylinder through the intake valve with a greater swirl ratio than a tumble ratio.

FIGS. 1-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine system comprising:
   a rotatable intake port circumferentially surrounding at least a portion of a stem of an intake valve coupled to a cylinder, the rotatable intake port having a first curved section extending inward toward or outward from a rotational axis of the rotatable intake port; and
   an intake port actuator coupled to the rotatable intake port configured to rotate the rotatable intake port about the rotational axis based on engine operating conditions.

2. The engine system of claim 1, where the rotatable intake port includes a second curved section positioned on an opposing side of the rotatable intake port with respect to the first curved section.

3. The engine system of claim 2, where the second curved section extends outward from the rotational axis and the first curved section extends inward toward the rotational axis.

4. The engine system of claim 3, where the intake port actuator is configured to:
   rotate the rotatable intake port into a first position where the second curved section is closer to an exhaust valve coupled to the cylinder than the first curved section, and
   rotate the rotatable intake port into a second position where the first curved section is closer to the exhaust valve than the second curved section.

5. The engine system of claim 4, where the rotatable intake port in second position generates an airflow pattern in air entering the cylinder through the intake valve with a greater tumble ratio than a tumble ratio of an airflow pattern in air entering the cylinder through the intake valve generated by the rotatable intake port in the first position.

6. The engine system of claim 4, where the first position and the second position are angularly separated by 180° with respect to the rotational axis.

7. The engine system of claim 4, where the intake port actuator is configured to rotate the rotatable intake port into a third position where the rotatable intake port is rotated by 90° in a clockwise direction with respect to the first position and where the third position generates an airflow pattern in air entering the cylinder through the intake valve with a greater swirl ratio than a tumble ratio.

8. The engine system of claim 7, where the intake port actuator is configured to rotate the rotatable intake port into a fourth position where the rotatable intake port is rotated by 90° in a counter-clockwise direction with respect to the first position, where the fourth position generates an airflow pattern in air entering the cylinder through the intake valve with a greater swirl ratio than a tumble ratio.

9. The engine system of claim 8, where a direction of the swirl flow pattern generated by the rotatable intake port in the third position opposes to a direction of the swirl flow pattern generated by the rotatable intake port in the fourth position.

10. An engine system in an engine, comprising:
    a rotatable intake port circumferentially surrounding at least a portion of an intake valve stem of an intake valve coupled to a cylinder, the rotatable intake port having a first curved section extending inward toward a rotational axis of the rotatable intake port and a second curved section extending outward from the rotational axis; and
    an intake port actuator coupled to the rotatable intake port configured to rotate the rotatable intake port about the rotational axis based on engine operating conditions to generate an airflow pattern in intake air entering the cylinder through the intake valve with selected tumble ratios and swirl ratios.

11. The engine system of claim 10, where the intake port actuator is configured to rotate the rotatable intake port into a first, second, third, and fourth position, the first second, third, and fourth positions generating airflow patterns in air entering the cylinder through the intake valve with different tumble ratios and swirl ratios.

12. The engine system of claim 11, where the first positon and the second position are angularly separated by 180° with respect to the rotational axis.

13. The engine system of claim 12, where the third and fourth positions are angularly separated by 180° with respect to the rotational axis, the first, second, third and fourth positions having distinct angular orientations.

14. The engine system of claim 11, where the rotatable intake port in second position generates an airflow pattern in air entering the cylinder through the intake valve with a greater tumble ratio than a tumble ratio of an airflow pattern in air entering the cylinder through the intake valve generated by the rotatable intake port in the first position.

15. The engine system of claim 11, where a direction of the swirl flow pattern generated by the rotatable intake port in the third position opposes to a direction of the swirl flow pattern generated by the rotatable intake port in the fourth position.

16. The engine system of claim 10, where the first curved section and the second curved section are positioned on opposing sides of the rotatable intake port.

17. A method for operating an engine system, comprising:
during a first operating condition, flowing intake air through a rotatable intake port in a first position, the rotatable intake port circumferentially surrounding at least a portion of an intake valve stem of an intake valve coupled to a cylinder and having a first curved section extending inward toward a rotational axis of the rotatable intake port and a second curved section extending outward from the rotational axis; and
during a second operating condition, flowing intake air through the rotatable intake port in a second position, where the first position generates an airflow pattern in air entering the cylinder through the intake valve with a greater tumble ratio than a tumble ratio of an airflow pattern in air entering the cylinder through the intake valve generated by the second position.

18. The method of claim 17, where in the first position the second curved section is closer to an exhaust valve coupled to the cylinder than the first curved section and in the second position the first curved section is closer to the exhaust valve than the second curved section.

19. The method of claim 17, further comprising during a third operating condition, flowing intake air through the rotatable intake port in a third position where the rotatable intake port is angularly separated by 90° in a clockwise direction about the rotational axis with respect to the first position and where the rotatable intake port in the third position generates an airflow pattern in air entering the cylinder through the intake valve with a greater swirl ratio than a tumble ratio.

20. The method of claim 19, further comprising during a fourth operating condition, flowing intake air through the rotatable intake port in a fourth position where the rotatable intake port is angularly separated by 90° in a counter-clockwise direction about the rotational axis with respect to the first position and where rotatable intake port in the fourth position generates an airflow pattern in air entering the cylinder through the intake valve with a greater swirl ratio than a tumble ratio.

\* \* \* \* \*